Oct. 8, 1957  L. J. FAGEOL  2,808,733
SINGLE LEVER CONTROL FOR POWER PLANT CARBURETOR AND TRANSMISSION
Filed May 24, 1956  2 Sheets-Sheet 1

INVENTOR
Louis J. Fageol
BY Strauch, Nolan & Neale
ATTORNEYS

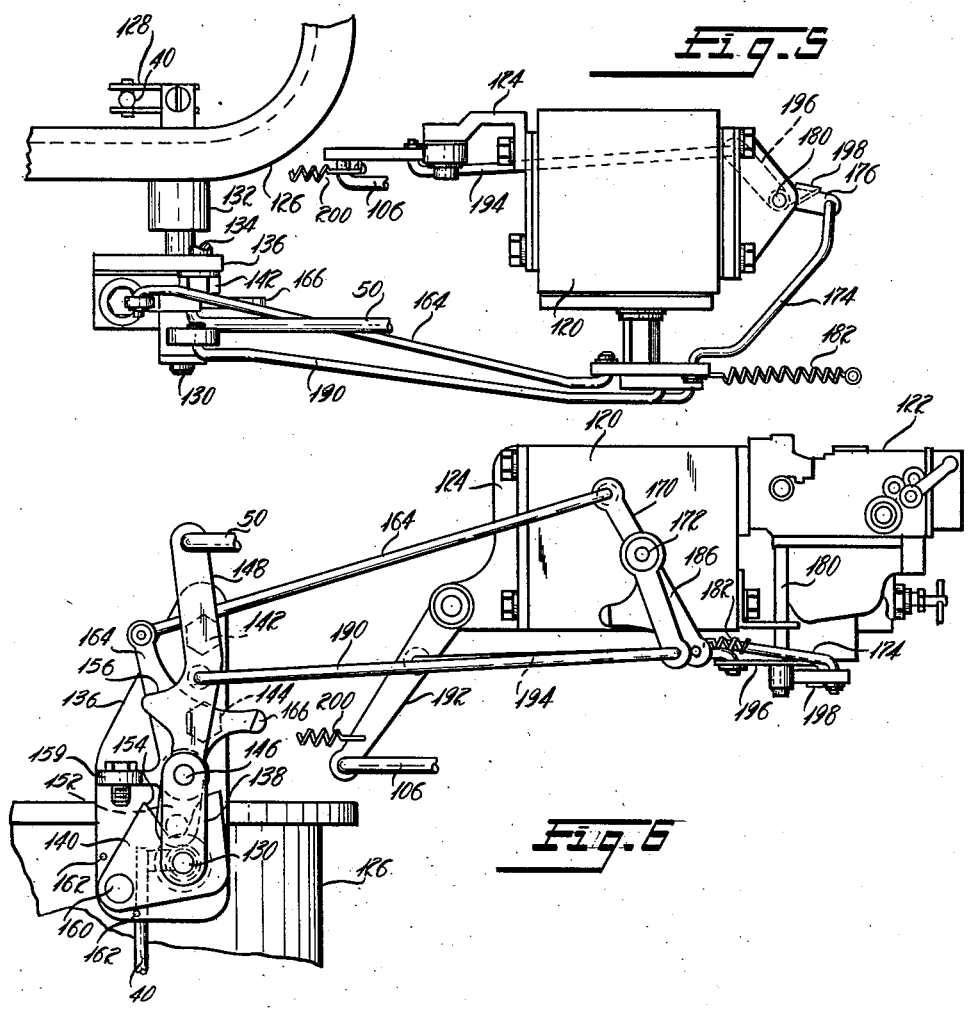

United States Patent Office 2,808,733
Patented Oct. 8, 1957

2,808,733

SINGLE LEVER CONTROL FOR POWER PLANT CARBURETOR AND TRANSMISSION

Louis J. Fageol, Kent, Ohio, assignor to Twin Coach Company, Kent, Ohio, a corporation of Ohio Application May 24, 1956, Serial No. 586,948

4 Claims. (Cl. 74—472)

This invention relates to systems for controlling the engine and propeller drive for power boats of inboard and outboard type.

While the invention is of general utility, it will be disclosed as applied to a control of an internal combustion engine installed as an outboard or an inboard power plant for a boat, since it is in such an environment that the advantages of the invention are at present most fully realized.

In most cases, the gearing to obtain forward, neutral and reverse, provided in outboard boats, particularly, is of simple construction and does not include a conventional clutch, substituting dog clutches therefor. Accordingly, to avoid damage to the power plant and to the gear train, the forward and reverse gears should be engaged only when the power plant is at idling speed, or substantially at its minimum power setting.

In conventional systems, now in general use, the throttle setting and the gear engagement are selected by independent controls, which must be carefully co-ordinated by the operator during gear changes. Unless the two sets of controls are manipulated carefully and properly, extensive damage or excessive wear may be produced in the engine or in the power train connecting the engine to the propeller. Proper arrangement of controls to avoid these consequences requires complicated and expensive throttle interlocking attachments on conventional systems which tend to prevent the rapid gear shifting which is necessary when the boat is being docked or maneuvered in a limited space. Because of this, proper operation is accomplished only by a highly experienced operator, and such manipulation is rendered particularly difficult by the fact that it is usually necessary that the operator also steer the boat simultaneously with the operation of the gear and carburetor controls. For these reasons most prior installations include a relatively expensive slip plate clutch between the engine and the transmission.

In the past it has been proposed to provide combined controls to eliminate certain of the deficiencies of the conventional dual control systems. However, none of these systems have been sufficiently simple and effective or positive enough in operation to warrant their adoption, except on a limited scale.

It is, accordingly, the primary purpose and object of the present invention to provide improved engine control systems in which a single control lever affects simultaneous and coordinated control of the throttle setting of the engine and the transmission connecting the engine to the propeller.

It is the further object of the present invention to provide improved control systems of the character described, in which the control lever may be located in any desired point, either remote from or adjacent to the power plant, and which affords positive and precise control in any position.

It is also an object of the present invention to provide improved control systems which are of simple, durable construction, which may be manufactured and sold at costs well below the cost of prior units having comparable performance.

It is a further object to provide improved control assemblies of the character described which for the first time permit the use of a simple, inexpensive dog clutch type transmission in inboard installations.

Additional objects and advantages will become apparent as the description proceeds in connection with the accompanying drawings, in which:

Figure 5 is a top plan view of a control system adapted particularly for use with an outboard installation; and Figure 6 is a side elevation of the system of Figure 5.

Figure 1:
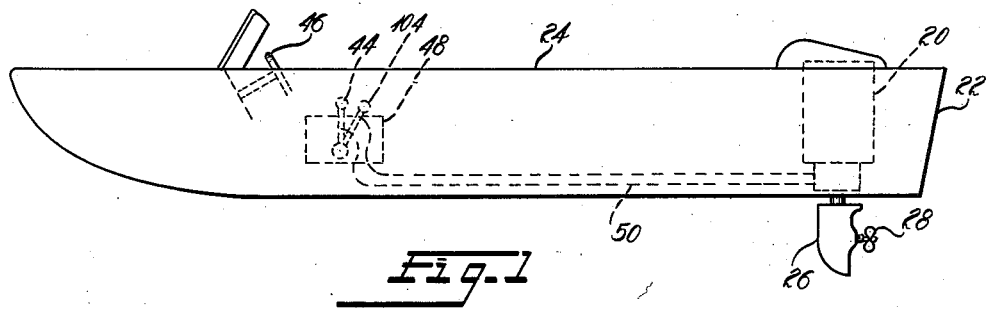
Figure 1 is a side elevation of a preferred inboard marine installation illustrating semi-diagrammatically the relation of the main control lever, power plant, and propeller drive.

Referring now more particularly to the drawings, Figure 1 illustrates semi-diagrammatically a marine inboard installation in which the control system of the present invention has been used with particular success. In this installation, the power plant, indicated generally at 20, which is an internal combustion engine, is installed just forward of the transom 22 of a boat indicated generally at 24. The power plant 20 is installed with the axis of the crank shaft disposed vertically and the drive shaft of the engine is connected directly to the input member of the transmission within housing 26 which drives the propeller 28. The power plant 20 and the housing 26 are mounted for unitary pivotal and tilting movement by a novel assembly which is more fully disclosed and claimed in co-pending application Serial No. 586,949, filed on even date herewith. The forward and reverse gearing shown in housing 26 may take a number of conventional forms. In the form shown for purposes of illustration, this gearing comprises a pair of bevel gears 30 and 31, rotatably mounted on power input shaft 32 and fixed against axial movement by means not shown. Gears 30 and 31 are constantly in mesh with a bevel gear 34 which is mounted on the power output shaft 36, which leads to the propeller 28. A dog clutch member 38 is splined to the shaft 32 and is movable into driving engagement with mating clutch elements rigid with the gears 30 and 31.

A control shaft 40 is provided with a fork 42 which carries clutch member 38 and extends upwardly into the interior of the boat 24. Upward movement of the shaft 40 from the neutral position shown in Figure 1 will engage the clutch to gear 30 to establish a forward drive connection. Downward movement of shaft 40 from the neutral position will establish a reverse drive connection.

As stated above, the single control lever for effecting coordinated control of the power setting of the engine 20 and the position of the gears in the housing 26 may be located in any desired position within the boat. However, in most cases the control lever which is indicated at 44, will be positioned as shown; that is, adjacent to steering wheel 46, for the convenience of the operator. Preferably, the control lever 44 is pivotally mounted in a protective frame assembly 48, for movement fore and aft in the boat. The control lever 44 is connected to the linkage assembly which forms the principal component of the control system of the invention, by a single flexible cable 50, which may be disposed at any convenient place within the boat. To provide for positive push-pull actuation the cable housing, not shown, is anchored to the hull at suitable points in accordance with conventional practice.

Figure 2:
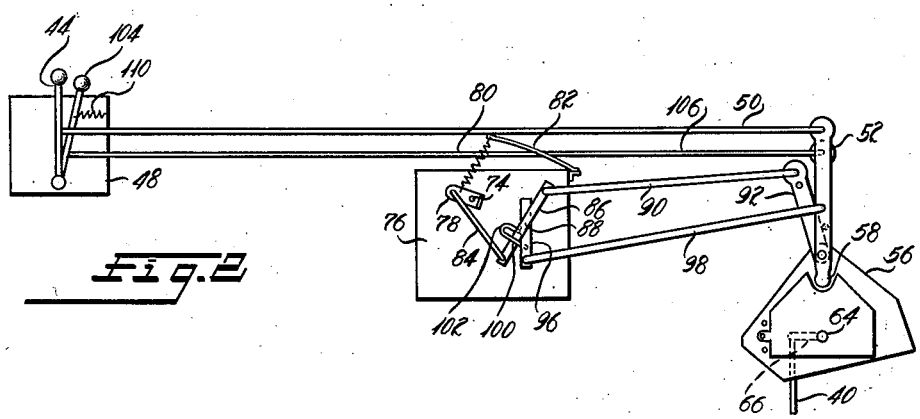
Figure 2 is an enlarged semi-diagrammatic view of the principal components of the control system linkage, showing the parts in position to put the drive gearing in neutral and to set the throttle at idle position.

Referring now more particularly to Figure 2, the end of the cable 50 remote from control lever 44, is secured to the upper end of a lever 52 pivotally mounted on a shaft 54 secured to a frame assembly 56 mounted at any convenient position within the boat. The frame 56 is mounted on the assembly which supports the power plant 20 and the gear housing 26 for swinging movement with the power plant so that swinging and tilting movements of the engine and drive assembly will not adversely affect the operation of the novel control system. The lower end of the lever 52 is formed with a rounded tooth or cam 58, which, in the position shown in Figure 2 is received in notch 60 in a second cam member 62, the latter being non-rotatably secured to a shaft 64 which is journaled for rotation in the frame assembly 56. The shaft 64 extends to a point in line with the transmission control shaft 40, and carries a crank arm 66, the outer end of which is secured to the upper end of the control shaft. Assuming the parts to be in the position shown, movement of the upper end of the main control handle 44 toward the rear of the boat will produce a corresponding movement of the upper end of lever 52 about the pivot 54 in a clockwise direction as viewed in Figure 2. Initial movement of the lever 52 will rock the cam member 62 in a counter clockwise direction, because of the engagement of tooth 58 in notch 60. The shaft 64 will thus rotate in a counter-clockwise direction, moving transmission control shaft 40 downwardly to engage the dog clutch 38 with the gear 31 to establish a reverse drive. When the gears are engaged, a detent 68 on the cam member 62 engages a suitable recess 70 in the frame 56 to prevent subsequent accidental displacement of the cam member 62. The tooth 58 and the notch 60 are so proportioned that once the cam member 62 has been rotated sufficiently to engage the clutch the tooth 58 will be free of the notch 60 and further movement of the lever 52 in a clockwise direction will not affect the position of the cam member 62. When the control lever is moved from its rearward position toward the neutral position shown, the lever 52 will be moved in a counter-clockwise direction. Just before the lever 52 reaches the position shown in Figure 2, the tooth 58 will re-engage the notch 60, and rotate the cam member 62 in a clockwise direction to restore the parts to the position shown in Figure 2, placing the gears in neutral.

When it is desired to place the gears in forward position, the operator moves the control lever 44 forward, thus rotating the lever 52 in a counter-clockwise direction as viewed in Figure 2. Again, initial movement of the lever 52 rotates the cam member 62, and the rotation of the latter member continues until the transmission control lever 40 is moved upwardly a sufficient distance to establish a drive connection between the clutch member 38 and the gear 30, at which time the detent 68 engages the recess 72 in frame 56 and the tooth 58 leaves the notch 60. Further movement of the control lever 44 in a forward direction will not affect the position of the cam member 62 since the tooth 58 is out of engagement with the notch 60.

The throttle control linkage will now be described with continuing reference to Figures 2 and 3.

The position of the throttle, not shown, is controlled by a throttle shaft 74, an extension of which is journalled in a plate 76, suitably attached to the power plant adjacent to the carburetors, not shown. The mechanism is so arranged that movement of the shaft in a clockwise direction as viewed in Figure 2, closes the throttle, while movement in a counter-clockwise direction moves the throttle toward an open position. Movement in the closing direction is limited by the usual idle stop, not shown.

A crank arm 78 is secured to the projecting end of shaft 74 and carries one end of a tension spring 80, the other end of which is secured to an arm 82 suitably mounted on plate 76 to urge the throttle shaft 74 and the associated linkage toward the throttle closed position. The free end of the crank arm 78 is connected by a push-pull rod 84 to the lower end of a lever 86 mounted for pivotal movement about the axis of a pin 88 suitably secured to plate 76. The opposite end of lever 86 is connected by a rigid push-pull rod 90 to the upper end of a lever 92 mounted for free pivotal movement on the shaft 54 which also rotatably carries the lever 52. The lever 92 carries a pin or arm 94, which projects into the path of the lever 52.

Figure 3:
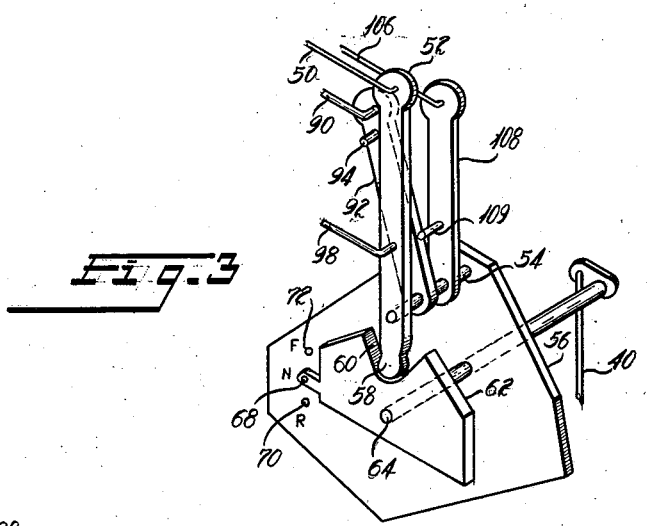
Figure 3 is a perspective view of a portion of the control system of Figure 2.
Figure 4:
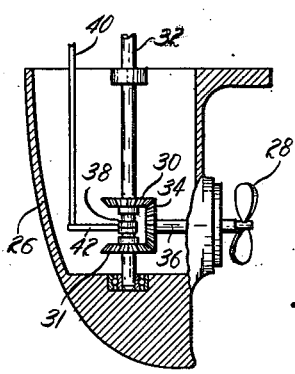
Figure 4 is a central section through the propeller drive assembly showing details of the drive gear.

The linkage system is so proportioned that when the throttle is against its stop, the pin 94 is spaced slightly from the adjacent edge of the lever 52, when the latter occupies a neutral position, as shown in Figures 2 and 3. Accordingly, forward movement of the control lever 44 and the resulting counter-clockwise movement of the lever 52 will pivot the lever 92 and open the throttle only after the cam member 62 has been moved sufficiently to establish a forward driving connection through clutch 38 and gears 30 and 34. Thus the initial movement of the control lever 44 and the lever 52 is effective only to position the cam 62, without affecting the throttle setting. The subsequent movement of the levers 44 and 52 is effective to open the throttle without affecting the setting of the cam member 62. Continued movement of the control lever in a forward direction will continue to open the throttle without affecting the gear setting, until a position of full throttle is reached. If it is desired to move the gears into reverse, the control lever 44 is moved rearwardly through the neutral position. Initial travel of the control lever 52 will permit the throttle to move toward the closed position under the influence of spring 80 and before the lever 52 resets the cam member 62, the throttle will be fully closed. Continued movement of the lever 44 to the rear will establish a reverse drive connection, as described above. The throttle is opened by further movement of the lever 44 in reverse direction by an additional linkage system, now to be described.

This additional linkage comprises a lever 96, mounted for independent pivotal movement on the pin 88, which carries the lever 86. A rigid push-pull rod 98 connects the lower end of lever 96 with the lever 52. The lever 96 carries a forwardly projecting arm 100, which is provided with a hook portion 102 encircling the lever 86. The parts are so proportioned that when the lever 52 is in the neutral position, or in any position between neutral and full throttle position, the hook 102 will be out of engagement with the adjacent edge of the lever 86. However, during rotation of the lever 52 in a clockwise direction to establish a reverse drive connection, the hook will engage the lever 86 immediately after the tooth 58 moves out of the notch 60. Continuing movement of the lever 52 will produce counter-clockwise or throttle opening movement of this lever. Ordinarily, the travel of the control lever 44 will be limited, so that a limited power setting, for example, one quarter throttle, may be obtained when the gears are in reverse.

An additional control of the throttle is provided to permit operation of the engine at any desired speed when the gears are in neutral, for starting, warm-up or testing. This control comprises a throttle lever 104 preferably mounted in housing 48 adjacent the main control lever 44, and connected by a flexible push-pull cable 106 to the free end of a lever 108 mounted for independent pivotal movement in the shaft 54 inwardly of the levers 52 and 92. The lever 108 is provided with an arm 109 projecting outwardly into the plane of lever 92. When the throttle is closed and the lever 104 is fully retracted, arm 109 is out of engagement with lever 92. A spring 110 is provided to assure return of the lever 108 to the position shown when it is released by the operator.

Counter-clockwise movement of the lever 104 as viewed in Figure 2, will produce similar movement of lever 108 and lever 92. When arm 109 contacts lever 92 the latter is rotated in a counter-clockwise direction thus moving the throttle toward open position without affecting the position of lever 52, cam 62 and the gear train. When the throttle 104 is released, the springs 80 and 110 immediately return the throttle to its idle setting.

Figures 5 and 6 illustrate a slightly modified transmission and throttle control system particularly adapted for installation on outboard motors of otherwise conventional construction. For clarity of illustration details of the engine have been omitted. A portion of the control linkage is supported on a mounting pad 120 which also supports the carburetor 122 (omitted from Figure 5). The remainder of the linkage is supported by a bracket 124 secured to the mounting pad 120 and by the main housing 126 of the power plant assembly.

In this form of the invention the transmission control shaft 40 projects upwardly through the interior of housing 126 and at its upper end is pivotally connected to a crank arm assembly 128 rigidly secured by any suitable means to a shaft 130. Shaft 130 is journalled in a boss 132 on the housing 126 and extends outwardly successively through a spacer 134, a mounting bracket 136 and a link 138. Between the link 138 and the mounting bracket 136 the shaft 130 non-rotatably carries a cam assembly 140. The mounting bracket 136 is rigidly secured to a portion of the motor frame (not shown) above the axis of the shaft 130 by bolts 142 and 144. A stub shaft 140 is mounted in and extends between the mounting bracket 136 and the upper end of the link 138. A lever 148 is pivotally mounted on the stub shaft 146 and at its upper end is attached to the flexible control cable 50 leading to the main control lever 44. At its lower end the lever 148 is provided with a tooth or cam 152 which normally fits within a notch 154 formed in the upper surface of the cam assembly 140. The lever 148 also carries an arm 156 which is adapted to engage a set screw assembly 158 adjustably mounted in a bracket 159 rigid with bracket 136 to adjustably limit the movement of the lever 148 in a counter-clockwise direction as viewed in Figure 5.

As in the previously described embodiment, initial movement of the lever 148 about the pivot axis 146 will rotate the cam assembly 140 sufficiently to move the gear control shaft away from the neutral position shown to establish reverse or forward drive connections. The subsequent rotation of the lever 148 in either direction is effected independently of the cam assembly 140. A detent assembly 160 carried by the cam assembly cooperates with suitable depressions 112 in the face of the mounting bracket 136 to hold the cam assembly 140 in neutral, forward, or reverse positions.

Mounted immediately behind the lever 148 on the stub shaft 146 is a lever 144 which carries an arm 166 projecting into the path of the lever 148. A rigid push-pull lever 168 connects the upper end of the lever 164 with the upper end of a lever 170 pivotally mounted on a stub shaft 172 rigidly secured to and projecting from the forward surface of the mounting pad 120. The lower end of the lever 170 is connected by rigid push-pull rod 174 to the free end of the lever 176 non-rotatably secured to the lower end of the throttle shaft 180.

The mechanism is so arranged that movement of the throttle shaft in a clockwise direction as viewed in Figure 5 opens the throttle. The throttle assembly is provided with the usual idle stop (not shown) and the lever system is biased toward throttle closed position by a spring 182 connected between the lower end of the lever 170 and any suitable fixed surface. An additional lever 186 is pivotally mounted on the shaft 172 in the path of an arm 188 which projects forwardly from the lever 170. The lower end of the lever 186 is connected by a rigid push-pull rod 190 to the lever 148 at a point between the pivot shaft 146 and the point of attachment of the control cable 50.

The mechanism thus far described is shown in its neutral position in Figures 5 and 6, disposing the throttle in idle position and the gears in neutral position. If, with the parts in this position, the control lever 44 is advanced, the control lever 148 will be moved in a clockwise direction about the pivot 146. Initial movement of the lever 148 in the clockwise direction will move cam assembly 140 in a counter-clockwise direction shifting the control shaft 40 downwardly to establish a forward drive connection in the gearbox. Subsequent movement of the lever 148 will not affect the position of the cam assembly 140. Because of the clearance between the arm 166 and the adjacent edge of lever 148 the initial gear setting movement of the lever 148 will not move the throttle linkage from its idling position. Lever 186 will be rotated in a counter-clockwise direction which will not affect the setting of the throttle.

After the gear setting movement of lever 148 is completed the lever will pick up the arm 166 and rotate lever 164 in a clockwise direction thus rotating the lever 170 in a clockwise direction. The throttle actuating arm 176 is thereby rotated in a clockwise direction as viewed in Figure 5 to move the throttle to any desired open position. When the control lever 44 is moved rearwardly these steps are reversed, sequentially closing the throttle and resetting the cam assembly 140 to neutral position.

Further retraction of the control lever 44 will rotate the control lever 148 in a counter-clockwise direction from the position shown in Figure 6 which will rotate the cam assembly 140 in a clockwise direction to establish a reverse drive connection in the gear box. Lever 146 is unaffected by this movement. The clearance between the arm 188 on the lever 170 and the adjacent edge of the lever 186 is such that these parts will contact each other only on completion of the gear setting movement of the lever 148. Thereafter further retraction of the control lever 44 will continue to rotate lever 148 in a counter-clockwise direction producing clockwise movement of the lever 186 and the lever 170 to open the throttle. Ordinarily the set screw assembly 158 will be so adjusted that the throttle opening movement when the gears are in reverse will be limited to approximately one-quarter throttle. If the main control lever 44 is again advanced, control lever 148 will be rotated in a clockwise direction sequentially closing the throttle and placing the gears in neutral position.

In this embodiment of the invention the independent throttle control lever 104 is connected by the cable 106 to a lever 192 pivotally mounted on the bracket 124. The lever 192 is connected by a push-pull rod 194 to one arm of a lever 196 which is mounted for free pivotal movement on the throttle shaft 180. The opposite end portion 198 of the lever 196 is bent downwardly to extend into the path of the adjacent edge of the throttle control lever 176. The several components of the linkage are preferably so proportioned that the end 198 of lever 196 will be closely adjacent the lever 176 when the throttle is in idle position and the auxiliary throttle lever 104 is fully retracted.

When the auxiliary throttle control lever is advanced, the lever 192 will be rotated in a counter-clockwise direction to rotate the lever 196 also in a clockwise direction as viewed in Figure 5 urging the arm 198 against the lever 176 to rotate the latter also in a clockwise direction toward throttle open position. The levers 170 and 164 will also be carried in a clockwise direction by this action but will not affect the position of the main gear control lever 148. A relatively heavy tension spring 200 extending between the lever 192 and any suitable fixed surface on the motor assembly is provided to assure full retraction of the lever 192 and the auxiliary throttle control lever 104, when the latter is released. This arrangement permits opening the throttle for warm-up or test when the gears are in neutral position.

From the foregoing it will be apparent that the above-stated advantages of the invention have been attained by the provision of improved combined controls for the carburetor and transmission of internal combustion engines, the controls being positive in operation, of relatively simple construction, and simplifying control of the power plant while providing for the full control necessary to perform all usual operations and maneuvers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for controlling an internal combustion engine having a throttle and being connected to a load through a transmission having neutral and forward drive connections comprising a cam mounted for rotation about a first fixed axis and operatively connected to said transmission, an operating lever mounted for pivotal movement about a second fixed axis spaced from said first fixed axis, cooperating means on said cam and said operating lever for positively moving said cam during initial movement of said lever in one direction from a neutral position to shift said transmission from neutral into forward and thereafter permitting independent movement of said operating lever with respect to said cam in said one direction, a pivotally mounted arm adjacent said operating lever for moving the throttle toward open position, one of said lever and said arm having a stop projecting into the path of the other, said stop being effective to move said arm with said lever only after said initial movement of said operating lever has engaged said forward drive connection, and means for moving said pivotally mounted arm and said throttle independently of said operating lever to permit opening said throttle when said transmission is in neutral.

2. Apparatus for controlling an internal combustion engine having a throttle spring biased toward an idle stop and movable away from said stop in one direction toward open position, said engine being connected to a load through a transmission having neutral, forward, and reverse drive connections comprising a cam mounted for rotation about a first fixed axis and operatively connected to said transmission, an operating lever mounted for pivotal movement about a second fixed axis spaced from said first fixed axis, cooperating means on said cam and said operating lever for positively moving said cam during initial movement of said lever in either direction from a neutral position to selectively shift said transmission from neutral into forward or reverse and thereafter permitting independent movement of said operating lever with respect to said cam, a throttle control lever operatively connected to said throttle for moving the throttle in said one direction away from said stop toward open position, a pivotally mounted arm adjacent said operating lever, one of said operating lever and said arm having a stop projecting into the path of the other, said stop being effective to move said arm and said throttle control lever only after initial movement of said operating lever has engaged said forward drive connection, and a one-way drive including a lost motion connection operatively connecting said operating lever and said throttle control lever and effective to move said throttle control lever in said one direction to open said throttle only after said initial movement of said operating lever has engaged said reverse drive connection.

3. Apparatus for controlling an internal combustion engine having a throttle spring biased toward an idle stop and movable away from said stop toward open position, said engine being connected to a load through a transmission having neutral, forward and reverse drive connections comprising: a pivotally mounted operating member operatively connected to said transmission, a main control member pivotally mounted adjacent said operating member, cooperating cam means rigid with said members for positively moving said operating member during initial movement of said main control member in either direction from a neutral position to selectively shift said transmission from neutral into forward or reverse and thereafter permitting independent movement of said main control member with respect to said operating member, a throttle controlled lever operatively connected to said throttle for moving said throttle in said one direction away from said stop and toward open position, means including a lost-motion connection between said main control member and said throttle control member for connecting said main control member and said throttle control member for co-movement only after said initial movement of said main control lever has engaged said forward drive connection, and additional means including a second lost-motion connection operative to connect said main control member and said throttle control member for moving the latter in said one direction only after said initial movement of said main control lever has engaged said reverse drive connection.

4. Apparatus for controlling an internal combustion engine having a throttle and being connected to a load through a transmission having neutral, forward and reverse drive connections comprising: a pivotally mounted operating member operatively connected to said transmission, a main control member pivotally mounted adjacent said operating member, cooperating cam means rigid with said members for positively moving said operating member during initial movement of said main control member in either direction from a neutral position to selectively shift said transmission from neutral into forward or reverse and to thereafter permit the independent movement of said main control member with respect to said operating member, a pivotally mounted throttle control member linked to said throttle and operable when moved in one direction about its pivotal axis to move said throttle in opening direction, and a pair of lost motion connections between said main control member and said throttle control member, one of said lost motion connections connecting said main control member and said throttle control member for co-movement only after initial movement of said main control lever has engaged said forward drive connection and the other lost motion connection being operative to connect said main control member and said throttle control member for co-movement only after said initial movement of said main control member has engaged said reverse drive connection.

References Cited in the file of this patent
UNITED STATES PATENTS
2,411,463  Pozgay _____ Nov. 19, 1946